United States Patent [19]

Braid

[11] 4,060,644
[45] Nov. 29, 1977

[54] BLEACHING
[75] Inventor: John Edwin Braid, Warrington, England
[73] Assignee: Interox Chemicals Limited, London, England
[21] Appl. No.: 685,188
[22] Filed: May 11, 1976
[30] Foreign Application Priority Data
    Feb. 9, 1976   United Kingdom .................. 5031/76
[51] Int. Cl.$^2$ ........................ A23L 1/277; A23L 1/325
[52] U.S. Cl. ...................................... 426/261; 426/643
[58] Field of Search .............. 426/261, 539, 643, 641, 426/644, 657; 260/112 R

[56] References Cited
U.S. PATENT DOCUMENTS

| 2,735,777 | 2/1956 | Meyer | 426/643 X |
| 3,036,923 | 5/1962 | Mahon | 426/643 X |
| 3,879,370 | 4/1975 | Carpenter et al. | 426/657 X |

FOREIGN PATENT DOCUMENTS

| 4,737,543 | 5/1968 | Japan | 426/261 |
| 875,596 | 8/1961 | United Kingdom | 426/657 |

Primary Examiner—Raymond N. Jones
Assistant Examiner—R. A. Yoncoskie
Attorney, Agent, or Firm—Larson, Taylor and Hinds

[57] ABSTRACT

A process for bleaching dark fish meat such as skeletal cod threshings. The fish is bleached in the undissolved state at ambient temperature with a dilute aqueous solution of hydrogen peroxide containing a polyphosphate at a pH of 10.5 to 11.5. Residual hydrogen peroxide is subsequently removed from the separated bleached fish by, for example, treatment with an aqueous solution of catalase at a pH of 7.5 to 8.0. The pH of the fish is finally adjusted to a value of from 6 to 7, that is, the pH of natural fish, by washing it with an aqueous solution of a food acid, for example, citric acid.

9 Claims, No Drawings

BLEACHING

The present invention relates to a process for fish bleaching.

After filleting of white fish such as cod, dark fish meat and muscle next to the backbone remain, and are not usually useful for human consumption at present. Secondly, in view of the general shortage of white fish, there is a growing desire to make use of deep sea fish, such as blue whiting or coley, which have dark fish meat. However, the acceptability of fish to the public in such manufactured foods as fish fingers depends to a considerable extent upon the colour and texture of the fish pieces. Thus, it is commercially desirable for a process for bleaching dark fish meat to produce a product having acceptable colour and texture.

In British Patent 1108188 Messrs. Libenson and Pirosky describe a process for the extraction of fish protein by treating fish for 2 hours at a pH of about 13 and a temperature of 50° C, and after purification stages the solution is deodorised with a peroxide solution having a concentration of 0.015% by weight, and a pH of 8.5, at a temperature maintained at 80° C for two hours. Such a process is extremely lengthy and requires considerable plant and energy to operate.

One of the inherent difficulties of employing an aqueous hydrogen peroxide solution at high pH's of about 13 or higher, is that valuable fish protein is extracted from the fish, thereby reducing its nutritional value.

In British Pat. No. 1409876, Astra Nutrition AB describe the use of hydrogen peroxide to decolourise fish flesh at a pH of not more than 9.5 and at a temperature of between 30° and 70° C, preferably between 40° and 60° C. In a comparative example, they describe a treatment in which waste fish is mixed with aqueous sodium hydroxide, macerated and heated (thereby presumably extracting fish protein into solution) and then mixed with hydrogen peroxide, and subsequently heated to 50° C, the final pH being 10.5. Since the hydrogen peroxide solution added would be acidic, the initial pH must have been higher than 10.5. The protein recovered from solution was stated to be unsuitable as a substitute or filler for animal proteins which are used for human consumption, because the nutritional quality was inadequate.

According to the present invention there is provided a process for fish bleaching comprising the steps of contacting dark fish meat in the undissolved state with a dilute aqueous solution of hydrogen peroxide at an initial pH of from 10.5 to 11.5, separating the fish meat from the solution when the fish meat has been bleached to a desired extent, removing any residual hydrogen peroxide from the fish, and adjusting the pH of the fish to below or approximately neutral.

Although higher temperatures of up to about 100° C, e.g. 30° – 60° C, can be employed, bleaching is conveniently effected at a temperature of from 10° to 30° C and preferably at about ambient temperature.

During bleaching, we have noticed that without the addition of further amounts of alkali, such as sodium hydroxide or sodium carbonate, the pH of the solution tends to drift downwards, for example an initial pH of 10.5 can fall to about pH 10.2. The invention includes embodiments in which the pH is maintained substantially constant and also those in which the pH is permitted to fall.

By employing an initial pH of from 10.5 to 11.5 we have found that bleaching requires much shorter reaction times than if a pH of below 10 is employed. In particular, we have found the rate of bleaching at a pH of 10.5 to 11.5 to be at least ten times faster than at a pH of 9.5 or lower. Short reaction times are inherently desirable since they permit a greater throughput using the same equipment, or enable a process more easily to form one of a series of linked processes, and furthermore minimise the amount of protein extracted into solution, and minimise the possibility of the fish or protein decomposition. Preferably the pH is maintained at from 10.5 to 11.0.

We have found that incorporation of polyphosphates into the hydrogen peroxide solution can result in a product having an improved texture or an improved process. Suitably the polyphosphate is an alkali or alkaline earth tripolyphosphate, conveniently sodium tripolyphosphate.

In practice, the solution preferably contains at least 0.1% polyphosphate, advantageously at least 0.5% polyphosphate and conveniently up to 10% polyphosphate, percentages being by weight based on the solution. By the use of aqueous hydrogen peroxide containing polyphosphate, especially in a concentration of from 0.9 – 10% by weight polyphosphate, under at least some conditions, improved fish bleaching can be obtained, as demonstrated by either faster bleaching or improved final whiteness. Also by controlling the pH of the solution in the presence of polyphosphate, we can obtain a product having a more attractive texture.

In practice, it is more important that the fish meat is contacted with a sufficient volume of liquid so that during at least most of the time the fish meat is in contact with the hydrogen peroxide solution. Suitably the weight ratio of fish to solution is in the range of from 1:3 to 1:30, preferably from 1:4 to 1:8. However, by the use of efficient mixing devices weight ratios of lower than 1:3 can also be employed, but generally speaking, as the ratio of solution to fish increases, so the rate of bleaching also increases.

The concentration of hydrogen peroxide in the solution can be varied over a wide range. We have found concentrations in the range of 0.5 to 1.0% by weight to be acceptable, in that in combination with a fish to solution ratio of from 1:4 to 1:8, such concentrations enable surface bleaching of fish to occur at ambient temperature in periods of the order of 10 to 20 minutes. However, higher concentrations, such as from 1% to 5% by weight are also acceptable, particularly if the solution is to be reused. In general, the higher the concentration of hydrogen peroxide, the faster the rate of bleaching so that concentrations of from 0.05% to 0.5% by weight of hydrogen peroxide become less preferable, when rapid bleaching is required. To some extent a decrease in the concentrations of hydrogen peroxide can be offset by an increase in the ratio of solution to fish. Weight ratios of fish to hydrogen peroxide of from 10:1 to 1000:1 can be employed successfully, ratios of no more than about 50:1 and preferably between 25:1 and 50:1 are desirably employed in practice, because they enable bleaching to occur at a faster rate than when higher ratios are used. Weight ratios of fish to hydrogen peroxide of less than 10:1 such as from 1:1 to 10:1 may be used, particularly if more than one batch of fish is to be treated with the same solution of hydrogen peroxide.

Conveniently, bleaching at a pH maintained at about 10.5, using aqueous hydrogen peroxide, containing from 0.5% to 10% by weight tripolyphosphate and from 0.5 to 1.0% by weight hydrogen peroxide in a weight ratio of fish meat to solution of from 1:4 to 1:8, produces bleached fish meat having an acceptable texture after no more than about 20 minutes, generally in the range 10 to 20 minutes, at ambient temperature.

We have found that one convenient way of obtaining a pH in the range of 10.5 to 11.5 is to use sodium carbonte or sodium hydroxide. According to a modification of the process the hydrogen peroxide is provided in situ by dissolution of sodium percarbonate, (food and drug grade). By sodium percarbonate we mean the addition product of hydrogen peroxide and sodium carbonate having the stoichiometric composition $Na_2CO_3.3/2H_2O_2$. Generally speaking, bleaching using an equivalent amount of sodium percarbonate has the advantage that addition of carbonate to regulate the pH occurs simultaneously with addition of hydrogen peroxide and in consequence simplifies the process.

Other peroxyhydrates may be used provided that the residual ions are washed out or are acceptable.

In addition to the hydrogen peroxide and/or sodium percarbonate, small quantities of sodium or potassium or ammonium peroxosulphates may be employed. A suitable molar ratio of hydrogen peroxide or sodium percarbonate to the peroxosulphate is from 1:1 to 10:1.

We have found that although surface bleaching of the fish proceeds very rapidly at a pH of from 10.5 to 11.5, bleaching becomes significantly slower as the bleaching solution has to penetrate further from the surface. In consequence, in order to obtain substantially evenly bleached fish meat, we prefer to use relatively small pieces such as flakes, or macerated meat because of the high surface area to volume ratio. Particularly suitable fish meat for bleaching in a process according to the present invention comprises waste material obtained after the filleting of white fish such as cod. The waste material can be gleaned from the fish skeletons by conventional mechanical methods and has a poor colour, which renders it less acceptable for human consumption. Other suitable fish include deep sea fish and coley and blue whiting, preferably shredded or macerated before treatment.

The fish can be bleached in a single step or in a series of steps. One appropriate method is to employ a counter current technique. By this method more efficient use can be made of the hydrogen peroxide.

In general unless the ratio of fish to hydrogen peroxide initially is very high e.g. about 1000:1 a certain amount of peroxide remains in the fish after the bulk of the solution has been removed. This residual hydrogen peroxide can be removed by any standard technique which does not itself leave any deleterious matter in or on the fish. Thus, part can be removed by water washing, or by compressing lightly to squeeze out excess liquid. A preferred method is to contact the fish with a dilute solution of catalase or L-ascorbic acid or a reducing agent, such as sodium sulphite, preferably in a concentration of from 0.5 to 2.5% by weight, or by heating the fish rapidly for a period of a few seconds up to about 100° C. Alternatively a combination of methods can be employed. When catalase is used, however, it is preferable to adjust the pH before removing the residual peroxide, to slightly alkaline, e.g. to pH 7.5 to 8.0.

For human consumption the fish, in general, should not be excessively acid or alkaline. This can be effected by washing the fish after the removal of residual peroxide with an acid such as acetic acid, citric acid, malic acid or L-ascorbic acid, to a pH of from 6 to 7, the pH of natural fish. Other accepted food acids may be used additionally or instead.

Having now described the invention generally, embodiments will now be described more fully by way of example.

EXAMPLE 1

In this Example, 100g of skeletal cod threshings were contacted at ambient temperature with 400 ml of an aqueous solution containing 0.7% by weight hydrogen peroxide, 0.4% by weight of a mixture of 40% by weight anhydrous sodium carbonate and 60% by weight calcium hydroxide. The solution had a pH of approximately 11.0. The fish threshings were immersed for 10 minutes at a temperature of 18° C and then removed, filtered, compressed slightly to remove solution and then washed with a solution containing 2.5% by weight of sodium sulphite. The resultant fish was found by the titanium complex formation test to be free of hydrogen peroxide. The fish was then washed with a 0.1% by weight solution of L-ascorbic acid until a slurry of the fish had a pH of 7. Visually the fish threshings had changed from brown to white. Confirmatory quantitative measurements were made by comparing the fish with a series of 12 whiteness tiles made by Ciba-Giegy. Each tile had a predetermined reflectance within the range of from 75% to 98% reflectance, measuring using light having a wavelength of $494 \times 10^{-9}$m, the measurement being compared with a barium sulphate standard. This method was chosen because the fish tended to present a rough rather than a smooth surface. The reflectance of the fish increased from a value of well below 75% to 82% after bleaching.

EXAMPLE 2

In this Example the process of Example 1 was followed except that the fish was shredded blue whiting and the hydrogen peroxide solution had a concentration of 0.3% by weight. The fish before bleaching had a reflectance of well below 75% and after 18 hours bleaching, 79%.

EXAMPLE 3

Brown skeletal cod threshings (100g) were contacted at ambient temperature with an aqueous alkaline solution of hydrogen peroxide (418g) containing 0.38% by weight anhydrous sodium carbonate, 0.81% by weight hydrogen peroxide and respctively 1%, 4% and 7.5% by weight sodium tripolyphosphate (food grade), the pH of which solution was adjusted to pH 10.5 by the addition of aqueous sodium hydroxide (20%). The fish threshings were gently agitated for 15 minutes at a temperature of 21° C in the hydrogen peroxide solution the pH of which was maintained at 10.5 by addition of further amounts of the aqueous sodium hydroxide. The fish threshings were strained from the solution and compressed slightly to extract further amounts of solution. The threshings were then agitated with water (300 ml) for 2 minutes and the washing procedure repeated a further two times. The fish threshings were slurried in water (400 ml) adjusted to pH 7.5 to 8.0 with 10% w/v citric acid solution and treated with a fresh aqueous solution of catalase (20 ml) containing 0.2 mg of the solid reagent. The mixture was agitated gently for 15 minutes after which, it was found, by the titanium complex formation test, to be free of hydrogen peroxide. The pH of the mixture was then adjusted to 6.5 with 10% w/v citric acid solution. Sufficient time was allowed for equilibration during pH adjustments. The fish was then separated and washed as before, further washed with two portions of water (50 ml each) using a vacuum filter and was found by testing with Universal indicator paper to have a pH of 6.

The products were compared with cod threshings which had been bleached, using an identical method except that the bleaching solution contained no phosphate. Visually the products according to this Example were clearly whiter, and had a more acceptable texture.

The titanium complex formation test for hydrogen peroxide referred to in Examples 1 and 3 is as follows:

A sample of the wash water or wash solution is added to an aqueous solution (5% w/v) of potassium titanium oxalate, acidified with sulphuric acid. The presence of hydrogen peroxide is evidenced by the development of a yellow colour due to the formation of pertitanic acid.

We claim:

1. A process for fish bleaching comprising the steps of contacting dark fish meat in the undissolved state with a dilute aqueous solution of hydrogen peroxide containing a polyphosphate at an initial pH of from 10.5 to 11 and at a temperature of from 10° to 30° C separating the fish from the solution when the fish meat has been bleached to a desired extent, removing any residual hydrogen peroxide from the fish, and adjusting the pH of the fish to below or approximately neutral.

2. A process according to claim 1, in which the fish is in divided form.

3. A process according to claim 1, in which the polyphosphate is an alkali or alkaline earth tripolyphosphate in a concentration of from 0.1 to 10.0% by weight on weight of solution.

4. A process according to claim 3, in which the concentration of polyphosphate is from 0.5 to 10.0% by weight on weight of solution.

5. A process according to claim 1, in which the weight ratio of fish to solution is in the range of from 1:3 to 1:30.

6. A process according to claim 1, in which the concentration of hydrogen peroxide in the solution is in the range of from 0.5 to 5.0% by weight.

7. A process according to claim 1, in which the weight ratio of fish to hydrogen peroxide is from 1:1 to 50:1.

8. A process according to claim 1 in which the residual hydrogen peroxide is removed by contacting the bleached fish meat with a dilute solution of catalase at a pH of from 7.5 to 8.0.

9. A process according to claim 1, in which the final adjustment of the pH of the fish to below or approximately neutral is carried out by washing the fish with an acid selected from the group consisting of acetic acid, citric acid, malic acid or L-ascorbic acid.

* * * * *